United States Patent
Kautzsch

(10) Patent No.: US 10,017,015 B2
(45) Date of Patent: Jul. 10, 2018

(54) METHOD FOR DETECTING WHEEL ROTATION USING A ONE-DIMENSIONAL ACCELERATION SENSOR

(75) Inventor: Thoralf Kautzsch, Dresden (DE)

(73) Assignee: Infineon Technologies AG, Neubiberg (DE)

(*) Notice: Subject to any disclaimer, the term of this patent is extended or adjusted under 35 U.S.C. 154(b) by 607 days.

(21) Appl. No.: 13/249,586

(22) Filed: Sep. 30, 2011

(65) Prior Publication Data
US 2013/0085710 A1   Apr. 4, 2013

(51) Int. Cl.
*G06F 15/00* (2006.01)
*B60C 23/04* (2006.01)

(52) U.S. Cl.
CPC ...... *B60C 23/0416* (2013.01); *B60C 23/0488* (2013.01)

(58) Field of Classification Search
CPC .............. B60C 23/0416; B60C 23/0488
USPC .............. 702/141, 98, 138; 73/146; 340/447
See application file for complete search history.

(56) References Cited

U.S. PATENT DOCUMENTS

| | | | |
|---|---|---|---|
| 5,442,331 A | 8/1995 | Kishimoto | |
| 6,204,758 B1 | 3/2001 | Wacker | |
| 6,559,634 B2 | 5/2003 | Yamada | |
| 6,591,671 B2 | 7/2003 | Brown | |
| 6,996,974 B2 | 2/2006 | Anilovich | |
| 7,673,505 B2 | 3/2010 | Hammerschmidt | |
| 7,693,626 B2 | 4/2010 | Breed | |
| 7,930,132 B2 | 4/2011 | Watasue | |
| 2004/0172179 A1* | 9/2004 | Miwa | 701/29 |
| 2004/0246117 A1 | 12/2004 | Ogawa | |
| 2007/0240501 A1 | 10/2007 | Mancosu | |

(Continued)

FOREIGN PATENT DOCUMENTS

| | | |
|---|---|---|
| CN | 101947905 A | 1/2011 |
| DE | 19856861 A1 | 6/2000 |

(Continued)

OTHER PUBLICATIONS

U.S. Appl. No. 12/184,296, filed Aug. 1, 2008, now U.S. Pat. No. 7,363,505, Inventor: Hammerschmidt.

(Continued)

*Primary Examiner* — John Breene
*Assistant Examiner* — Yaritza H Perez Bermudez
(74) *Attorney, Agent, or Firm* — Schiff Hardin LLP

(57) ABSTRACT

Embodiments relate to TPMS utilizing a single-axis acceleration sensor for measuring the direction of rotation of the tires in a tire localization methodology. In an embodiment, the known axis position of the acceleration sensor in the tires allows for the assessment by an integrated circuit in order to determine the left or right positioning of a tire, as well as the magnitude of acceleration or deceleration. Because of the dual components of the measured acceleration signal of first, the directional acceleration of the vehicle and second, the oscillating modulation due to gravity, the generated waveform is known to have differences between the left and right tire signals of an accelerating and decelerating vehicle. The impact of the oscillating modulation on the directional acceleration of the vehicle can be utilized to identify tire rotation direction, and thus the wheels localized therefrom, as well as the magnitude of acceleration and deceleration.

14 Claims, 7 Drawing Sheets

(56) References Cited

U.S. PATENT DOCUMENTS

| | | |
|---|---|---|
| 2007/0255510 A1 | 11/2007 | Mancosu |
| 2007/0282553 A1* | 12/2007 | Fujimoto ................. 702/104 |
| 2008/0196492 A1 | 8/2008 | Achterholt |
| 2009/0012740 A1* | 1/2009 | Hain et al. ............... 702/148 |
| 2009/0027183 A1 | 1/2009 | Kvisteroy |
| 2009/0088939 A1* | 4/2009 | To et al. .................. 701/72 |
| 2009/0204361 A1 | 8/2009 | Watasue |
| 2009/0234591 A1 | 9/2009 | Savaresi |
| 2010/0231403 A1 | 9/2010 | Bortolin |
| 2011/0082663 A1* | 4/2011 | Geisler et al. ........... 702/141 |
| 2011/0132081 A1 | 6/2011 | Lee |
| 2011/0148331 A1 | 6/2011 | Parison |
| 2012/0200408 A1 | 8/2012 | Gotschlich |
| 2012/0253590 A1 | 10/2012 | Fink |

FOREIGN PATENT DOCUMENTS

| | | |
|---|---|---|
| DE | 102004042191 B3 | 2/2006 |
| DE | 102006018363 A1 | 11/2006 |
| DE | 102007028518 A1 | 12/2008 |
| DE | 102008007775 A1 | 8/2009 |
| DE | 102009020428 A1 | 5/2010 |
| DE | 102010007009 A1 | 8/2011 |
| FR | 2942895 A1 | 9/2010 |
| WO | WO 2006/100577 | 9/2006 |

OTHER PUBLICATIONS

Application No. 2012103769350, Chinese Office Action, dated Aug. 22, 2014, 14 pages.

\* cited by examiner

METHOD FOR DETECTING WHEEL ROTATION USING A ONE-DIMENSIONAL ACCELERATION SENSOR

TECHNICAL FIELD

The invention relates generally to tire pressure monitoring systems (TPMS) and more particularly to localization of TPMS wheel modules on a vehicle.

BACKGROUND

Tire pressure monitoring systems (TPMS) on vehicles are generally required in the U.S., with Europe and countries in Asia to follow. The legislation mandating the use of TPMS typically sets a pressure warning threshold level which is monitored by wheel-based units, or wheel modules, in direct TPMS. The wheel modules are mounted inside of each tire, such as on the rim, valve, or in-tire, in order to periodically or continuously monitor the inflation pressure of the tire.

Each wheel module typically includes a pressure sensor, control logic such as a microcontroller, a power source such as a battery, and a radio frequency (RF) transmitter that communicates pressure readings from the pressure sensor to a central TPMS receiver mounted elsewhere in the vehicle. Some wheel modules also comprise an acceleration sensor for determining when the vehicle is in motion in order to conserve battery life.

The process of identifying which wheel module sent a particular signal, and therefore which tire may have low pressure, is called localization. When a low pressure situation is detected, drivers generally want to know which tire is low, rather than simply that one of the tires is low, which often requires each to be checked in order to determine which tire actually needs attention. Effective and efficient localization is an on-going challenge in TPMS because tires are frequently rotated and sometimes changed out between summer and winter, altering their positions. Additionally, power constraints on the wheel modules make frequent communications and localization signal transmissions impractical.

In an example localization scheme utilizing an acceleration sensor, the radial component of the acceleration is determined in order to ascertain the direction of rotation of each wheel. However, depending on the location of the sensor in the respective tires, very high radial accelerations can be sensed. For example, for a vehicle with a 16-inch rim traveling at 200 km/h, an acceleration of 15,436 m/s$^2$ can be sensed in the radial component. Therefore, difficulty exists in achieving the requisite resolution in the radial direction without the acceleration sensor spring constant becoming so small that the sensor mass strikes the walls of the sensor during normal operation.

Therefore, there is a need for improved localization techniques in TPMS systems utilizing acceleration sensors.

SUMMARY

In an embodiment, a method comprises determining an acceleration sensor profile for each of a plurality of wheels of a vehicle, wherein the profile defines at least an axis of orientation of the acceleration sensor relative to the wheel; receiving a first acceleration data signal from at least one wheel module located on a first side of the vehicle and a second acceleration data signal from at least one wheel module located on a second side of the vehicle; determining a zero-acceleration point between the first and second acceleration data signals; and partially localizing, by identifying the location relative to the first and second sides, each of the wheel modules based on at least an evaluation of the acceleration sensor profile and the data signal.

In an embodiment, a method comprises receiving a first oscillated acceleration signal of a first wheel module; receiving a second oscillated acceleration signal of a second wheel module; and localizing the first and second wheel modules based on at least an evaluation of the first oscillated acceleration signal.

In an embodiment, a system comprises a plurality of wheel modules, each wheel module associated with a wheel of a vehicle and comprising an acceleration sensor configured to sense acceleration related to the wheel, wherein each acceleration sensor has a uniform acceleration sensor placement relative to the wheel, and each acceleration sensor has an acceleration sensor profile defining at least an axis of orientation of the acceleration sensor relative to the wheel such that wheels on opposite sides of the vehicle have opposite axes of orientation; and a central receiver unit configured to receive signals from the plurality of wheel modules, the signals comprising acceleration data sensed by the acceleration sensor, and to partially localize each wheel of the vehicle by evaluating the received signals relative to the acceleration sensor profile.

In an embodiment, a wheel module associated with a wheel of a vehicle comprises an acceleration sensor configured to sense acceleration related to the wheel, the sensed acceleration being oscillated by gravity when the wheel is in motion, and the acceleration sensor having an acceleration sensor profile defining at least an axis of orientation of the acceleration sensor relative to the wheel; a communications unit configured to receive acceleration data from a second wheel module; a microcontroller configured to accumulate data from the acceleration sensor and partially localize the wheel module relative to the second wheel module based on the acceleration sensor profile and the accumulated sensor data; and a power source configured to provide power to at least the acceleration sensor, microcontroller, and communications unit.

In an embodiment, a wheel module associated with a wheel of a vehicle comprises an acceleration sensor configured to sense acceleration related to the wheel, the sensed acceleration being oscillated by gravity when the wheel is in motion, and the acceleration sensor having a fixed-orientation mounting position relative to the wheel; a microcontroller configured to accumulate data from the acceleration sensor; a communications unit configured to transmit data from the microcontroller to a central receiver unit to partially localize the wheel module relative to the vehicle based on the acceleration mounting position and the data accumulated from the acceleration sensor; and a power source configured to provide power to at least the acceleration sensor, microcontroller, and communications unit.

BRIEF DESCRIPTION OF THE DRAWINGS

The invention may be more completely understood in consideration of the following detailed description of various embodiments of the invention in connection with the accompanying drawings, in which.

Figure 1:
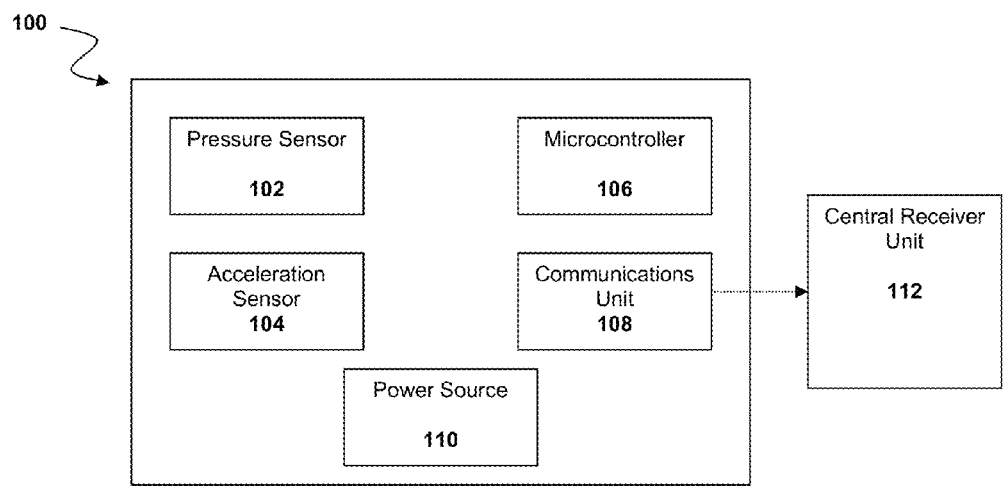
FIG. 1 depicts a block diagram of a wheel module and receiver unit according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Embodiments relate to TPMS utilizing a single-axis acceleration sensor for measuring the direction of rotation of the tires in a tire localization methodology. In an embodiment, the known axis position of the acceleration sensor in the tires allows for the assessment by an integrated circuit in order to determine the left or right positioning of a tire, as well as the magnitude of acceleration or deceleration. Because of the dual components of the measured acceleration signal of first, the directional acceleration of the vehicle and second, the oscillating modulation due to gravity, the generated waveform is known to have differences between the left and right tire signals of an accelerating and decelerating vehicle. The impact of the oscillating modulation on the directional acceleration of the vehicle can be utilized to identify tire rotation direction, and thus the wheels localized therefrom, as well as the magnitude of acceleration and deceleration.

Advantages of the aforementioned approach include the use of one single single-axis acceleration sensor per tire to determine the rotation of the tire, thus reducing power consumption and interaction complexity between TPMS components. Further, the single-axis acceleration sensor can operate at normal vehicle speeds without the sensor mass striking the walls of the sensor. Another advantage is that the acceleration sensor is mounted in the same, known position among all four tires, thus reducing maintenance and upkeep costs when rotating or replacing tires. The localization techniques and systems of the present invention can be used not only in TPMS applications, but any application where localizing the tires of a vehicle is desirable. For example, applications integrating wear sensors, or applications integrating anti-lock brake (ABS) sensors also contemplate localization techniques. The application of the present invention is not limited to pressure monitoring systems.

FIG. 1 depicts a wheel module according to an embodiment. Wheel module 100 comprises a pressure sensor 102, an acceleration sensor 104, control circuitry such as a microcontroller 106, a communications unit 108 and a power source 110 in an embodiment.

Pressure sensor 102 is used to monitor the pressure of the tire by periodically sensing the pressure. Acceleration sensor 104 can be used to detect rotation, which helps to reduce power consumption by only taking pressure measurements when the vehicle is in motion. In an embodiment, acceleration sensor 104 is a single-axis acceleration sensor allowing for measurement of tangential acceleration in one direction.

Communications unit 108 comprises a radio frequency (RF) transmitter in one embodiment to transmit signals to a central receiver unit 112. In a unidirectional TPMS embodiment, module 100 is autonomous in that it transmits to but does not receive wireless communications from central receiver unit 112, reducing power consumption. In other embodiments, communications unit 108 can comprise an RF transmitter/receiver or some other wireless communications module and can be separate from (as depicted) or integrated with microcontroller 106 in embodiments. Power source 110 comprises a battery or other suitable power source in embodiments.

Figure 2A:
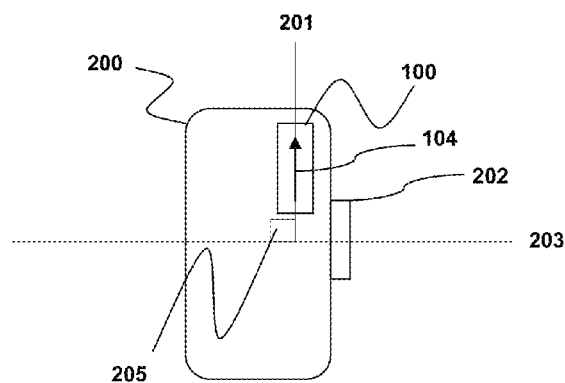
FIG. 2A depicts a block diagram of a wheel module in a wheel according to an embodiment.
Figure 2B:
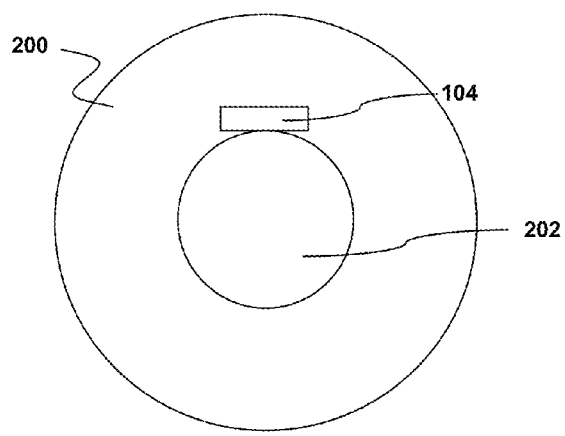
FIG. 2B depicts a side perspective block diagram of the wheel module and wheel of FIG. 2A.

Referring to FIGS. 2A and 2B, wheel module 100 can be mounted in a tire 200. In embodiments, wheel module 100 can be mounted to the rim, valve stem, or in-tire. Axle 202 is shown for perspective of the mounting direction and orientation. Further, FIG. 2A is depicted with graph axes overlaid on tire 200 and axle 202 in order to show the orientation of wheel module 100 relative to tire 200. A typical passenger vehicle having four wheels will therefore have four wheel modules, one in each tire 200, as shown generally in FIG. 3, thus enabling each wheel module 100 to monitor the tire pressure of the tire associated with the wheel in which it is mounted. In embodiments, wheel module 100 can comprise more or fewer components. For example, wheel modules 100 can comprise a temperature sensor in order to provide temperature compensation. Additional sensors, such as to monitor other characteristics of the tire, wheel, and environment, can also be included in other embodiments. Further, in other embodiments, wheel module 100 may have various components located in positions discrete from the rest of components of wheel module 100, depending on the application and component.

Referring specifically to FIG. 2A, wheel module 100 of tire 200 is mounted such that single-axis acceleration sensor 104 is in a decentered, known direction relative to tire 200, and more specifically, to axle 202. Such a direction and mounting position can define an acceleration sensor profile. As depicted, acceleration sensor 104 is mounted decentered and orthogonal to axle 202 such that the positive axis of acceleration sensor 104 is exposed for tires 200 mounted on the left side of a vehicle when the vehicle travels in a forward direction. The graph axes of FIG. 2A illustrate the aforementioned orthogonality. Wheel module axis 201 intersects axle axis 203 to form right angle 205, and thereby make acceleration sensor 104 orthogonal to axle 202. In other embodiments, the negative axis of acceleration 104 is exposed for tires 200 mounted on the left side of a vehicle when the vehicle travels in a forward direction. As discussed above, acceleration sensor 104 may be mounted discretely from the rest of wheel module 100, as appropriate.

Figure 3:
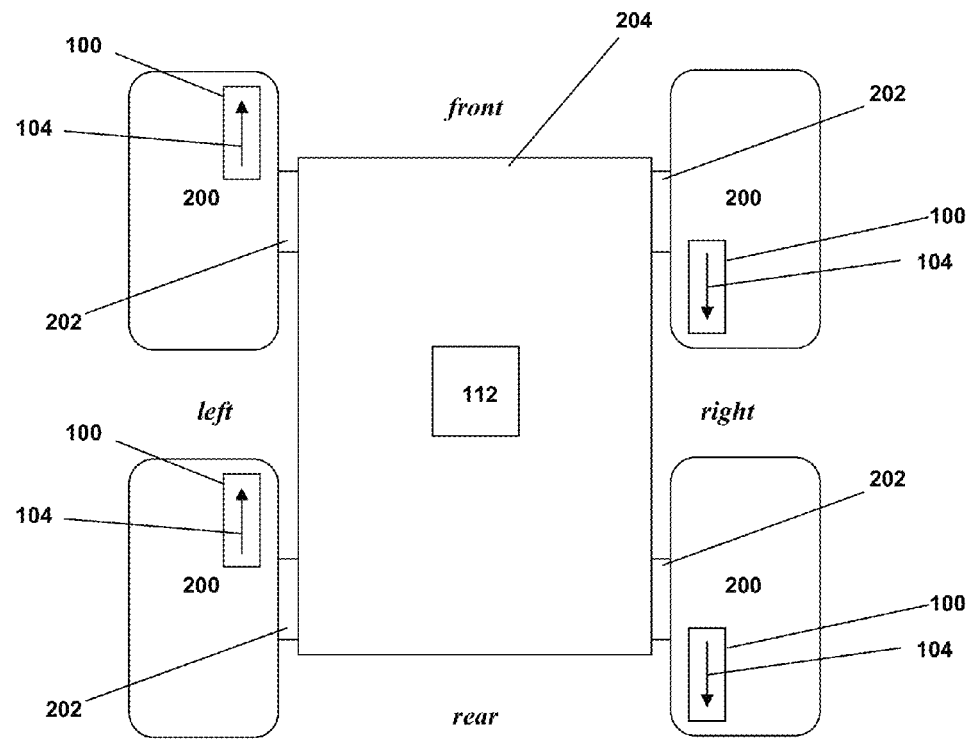
FIG. 3 depicts a block diagram of the wheel module and acceleration sensor of FIGS. 2A and 2B on a vehicle according to an embodiment.

Referring to FIG. 3, each individual tire 200 is mounted to vehicle body 204 via axle 202. Front-left and back-left tires 200 are mounted such that the positive axis of acceleration sensor 104 of each respective tire 200 is exposed when the vehicle moves in a forward direction (towards the front of the vehicle). Appropriately, by rotation about axles 202 to the correspondingly opposite positions of vehicle body 204 from front-left and back-left tires 200, respectively, front-right and back-right tires 200 are mounted such that the negative axis of acceleration sensor 104 of each respective tire 200 is exposed when the vehicle moves in the same forward direction. Thus, the mounting position of acceleration sensor 104 is identical in each tire 200, but differs with respect to the positioning relative to vehicle body 204. As such, each tire has a uniform acceleration sensor 104 placement.

In an embodiment, the single-axis acceleration sensor 104 measures tangential acceleration in one direction. In general, the measured acceleration of a vehicle can be broken into three components. The first component is the directional acceleration of the vehicle. The second component is the oscillating modulation due to gravity. The third component is a constant tangential acceleration. Because of the mounting of the acceleration sensor 104 in the tire 200 and the rotation of the tire 200 when in motion, the orientation of the sensor changes during each tire revolution (e.g., right-side up, sideways, upside-down, sideways, right-side up, etc.). This causes a signal change of +/−1 g because of the effects of the constant acceleration of gravity, which, while rotating over time, results in a sinusoidal ripple on top of the acceleration signal due to vehicle acceleration.

Figure 4:
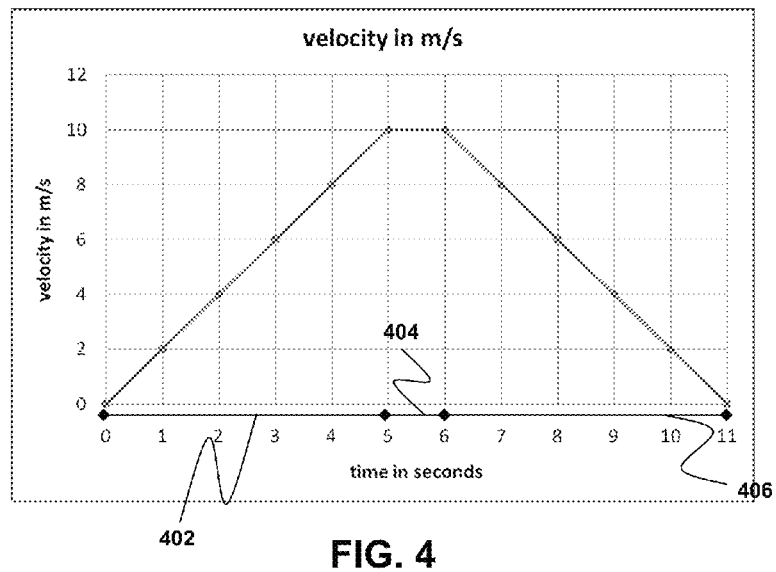
FIG. 4 depicts a graph of velocity as a function of time for an example travel situation according to an embodiment.
Figure 5:
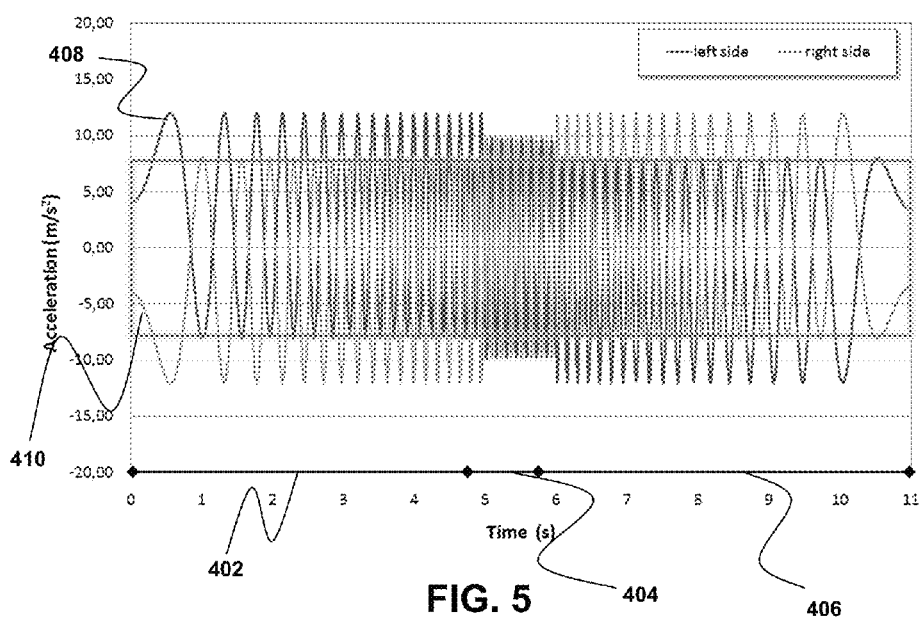
FIG. 5 depicts a graph of acceleration for tangentially-fitted TPMS sensors fitted in both a left and right tire as a function of time for the travel situation of FIG. 4 according to an embodiment.

Referring to FIG. 5, a graph of the acceleration of a vehicle utilizing tangentially-fitted TPMS sensors fitted in both a left and right tire is depicted for the example travel situation of FIG. 4. In FIG. 4, an example travel situation is illustrated where a vehicle accelerates from a complete stop, maintains a constant velocity once a target velocity is reached, and decelerates to a complete stop. Specifically, at 402, the vehicle accelerates from time 0 to time 5 to a target velocity of 36 km/h. At 404, from time 5 to time 6, the vehicle maintains a constant velocity (i.e. zero acceleration) of 36 km/h. Beginning at time 6, the vehicle commences decelerating, which continues through time 11 at 406. Referring again to FIG. 5, the signal represented by the left tire 408, the top line at time 0 when both lines advance from the y-axis, is offset from the signal represented by the right tire 410, the bottom line at time 0 when both lines advance from the y-axis, during the period of acceleration (time 0 to time 5) at 402. Similarly, the left tire and right tire signals 408 and 410 are offset during the period of deceleration (time 6 to time 11) at 406. This offset is due to the installation of the axes of acceleration sensors 104 in opposite directions between left side tire 200 and right side tire 200 when viewed with the oscillating modulation of gravity. The centroid and sign of the offsets are dependent on whether the vehicle is accelerating or braking For example, the area between the left tire signal 408 and the right tire signal 410 when the vehicle is accelerating at 402 has decreases as the vehicle approaches its target velocity. Conversely, when the vehicle is decelerating at 406, the area between the left tire signal 408 and the right tire signal 410 increases as the vehicle slows to a stop.

As is illustrated herein, an acceleration sensor 104 incorporated in a tire 200 on the left side of a vehicle and an acceleration sensor 104 incorporated in a tire 200 on the right side of a vehicle exhibit inverse behavior with respect to one another. Also illustrated, the frequency of the modulation of the acceleration sensors 104 increases upon acceleration and decreases upon deceleration. Further, at constant acceleration, the left tire and right tire show signals having identical peak-to-peak height, but peaking opposite each other.

The aforementioned dynamics can be assessed by an integrated circuit in order to localize the tires. In embodiments, these and other calculations are performed by microcontroller 106. In other embodiments, data can be transmitted to central receiver unit 112 for calculations, as central receiver unit 112 does not have the same power consumption limitations as microcontroller 106. For example, individual tire 200 acceleration sensor 104 data can be accumulated or integrated as desired by microcontroller 106. The data can be transferred to central receiver unit 112 via communications unit 108. Such a procedure can be repeated for each wheel module 100 and conducted in real time such that central receiver unit 112 has access to the acceleration data of all four tires. Other data communication and processing schemes are also possible in other embodiments.

Figure 6:
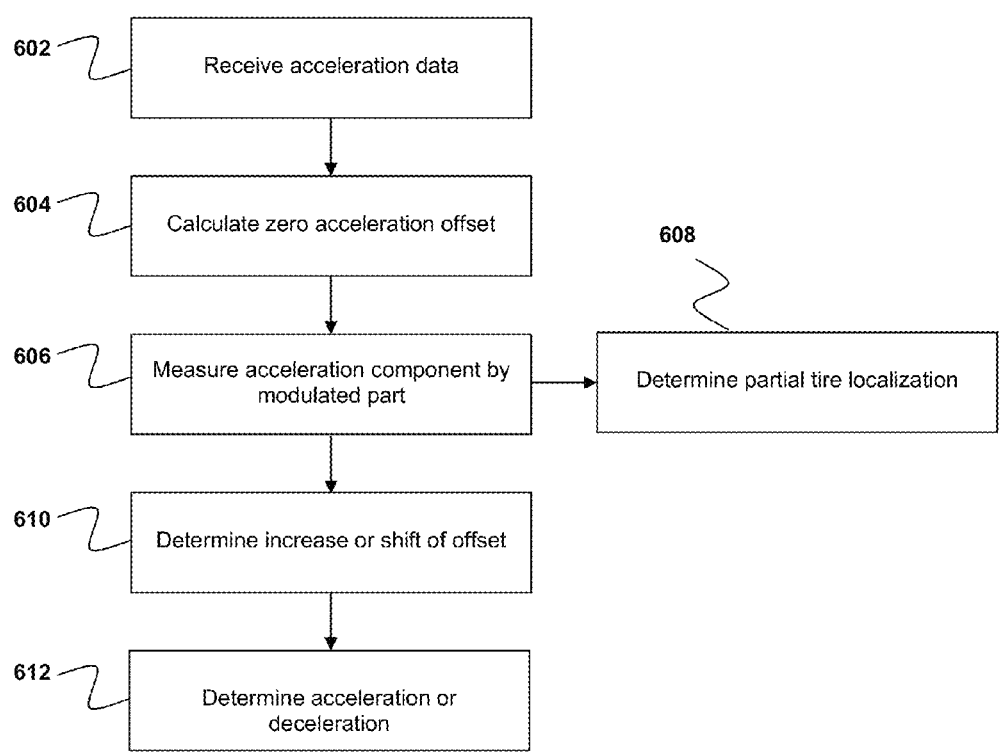
FIG. 6 is a flowchart of a method according to an embodiment.

Referring to FIG. 6, central receiver unit 112 first receives acceleration data from wheel modules 100 for individual acceleration sensors 104 at 602. A zero-acceleration point can then be calculated at 604 so that a zero point of reference with no oscillation is established. No oscillation is present when the vehicle is at rest because of the lack of rotation of the acceleration sensor 104 and tire 200 about axle 202. Should an unwanted offset be present when the vehicle is at rest, in the case of fabrication defects, for example, that offset can be detected at 604. Any fabrication offset can then be considered in subsequent calculations, including calculating when the vehicle is in motion, as will be discussed herein. Conversely, when the vehicle is at rest and a zero point of reference establishes an aligned acceleration sensor 104 via no fabrication offset when the vehicle is at rest, subsequently where an offset is present, the vehicle is known to be in motion. Upon movement of the vehicle, it will be clear which signals originate from opposite sides of the car and are appropriate for comparison, as the signals will not be identical—one will have a positive slope and the other will have a negative slope. In contrast, signals for both of the tires on the same side will exhibit the same acceleration signature, as they would both have an acceleration sensor 104 mounted in the same direction. Next, referring again to FIG. 6, the acceleration component of the vehicle, as modulated by the oscillation of gravity, is measured by central receiver unit 112 at 606. A determination of left or right tires, or partial tire localization, can be made at 608 based on an evaluation of the received acceleration data at 602 due to the known positioning of acceleration sensors 104 within the tires.

The amount of increase or shift of offset can then be determined from the zero acceleration point at 610. At 612, a determination of acceleration and deceleration of the vehicle can be calculated. Because of the oscillating modulation due to gravity as measured by acceleration sensor 104, the measurement of acceleration and deceleration can be much more precise. This precision is due to the coupled measurement of oscillating and constant signal components.

Once partial tire localization is completed and left and right tires are identified, known methods of discriminating between front and rear tires can be employed. For example, in a TPMS system utilizing RF transmitters as communications unit 108 to transmit signals to central receiver unit 112, a decentered, rearward-placed central receiver unit 112 can detect RF signal strength. The central receiver unit 112 can interpret one set of communications units 108 as being closer by a greater RF signal strength, and therefore representing rear tires, than another set of communications units 108, which are detected as farther away by a relatively weaker RF signal strength, and therefore representing front tires. Other methods are also considered.

Figure 7A:
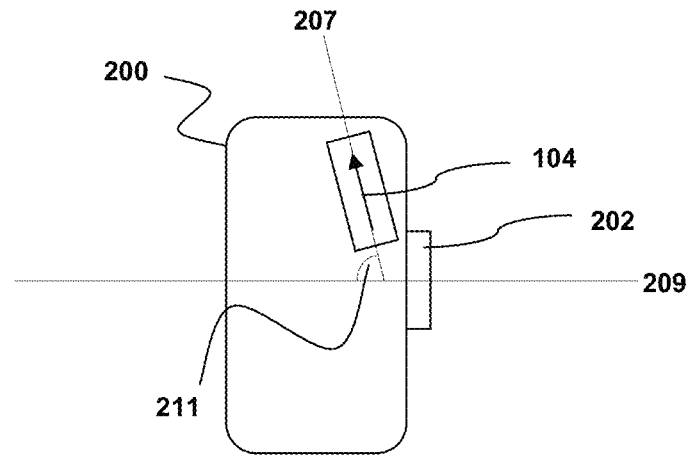
FIG. 7A depicts a block diagram of a wheel module having a sensor mounted non-tangentially according to an embodiment.
Figure 7B:
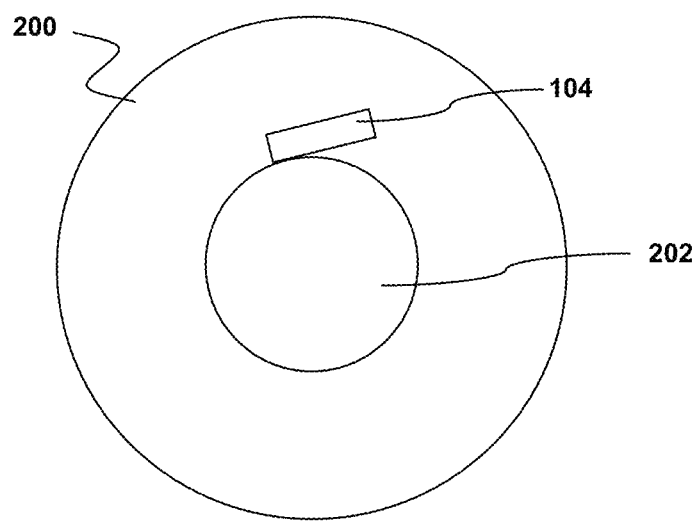
FIG. 7B depicts a side perspective block diagram of a wheel module having a sensor mounted non-tangentially according to an embodiment.

The advantage of incorporating the modulated component due to gravity in a localization scheme becomes even more evident when mounting failures and sensor fabrication errors are considered. When acceleration sensor 104 is not mounted perfectly tangentially with tire 200, for example as in FIG. 7A, the radial component of the acceleration measurement is much greater than when acceleration sensor 104 is mounted perfectly tangentially. FIG. 7A is depicted with graph axes overlaid on tire 200 and axle 202 in order to show the imperfect mounting orientation of wheel module 100 relative to tire 200. As shown, wheel module axis 207 intersects axle axis 209 to form acute angle 211. Another imperfectly mounted acceleration sensor 104 is shown in FIG. 7B.

Figure 8:
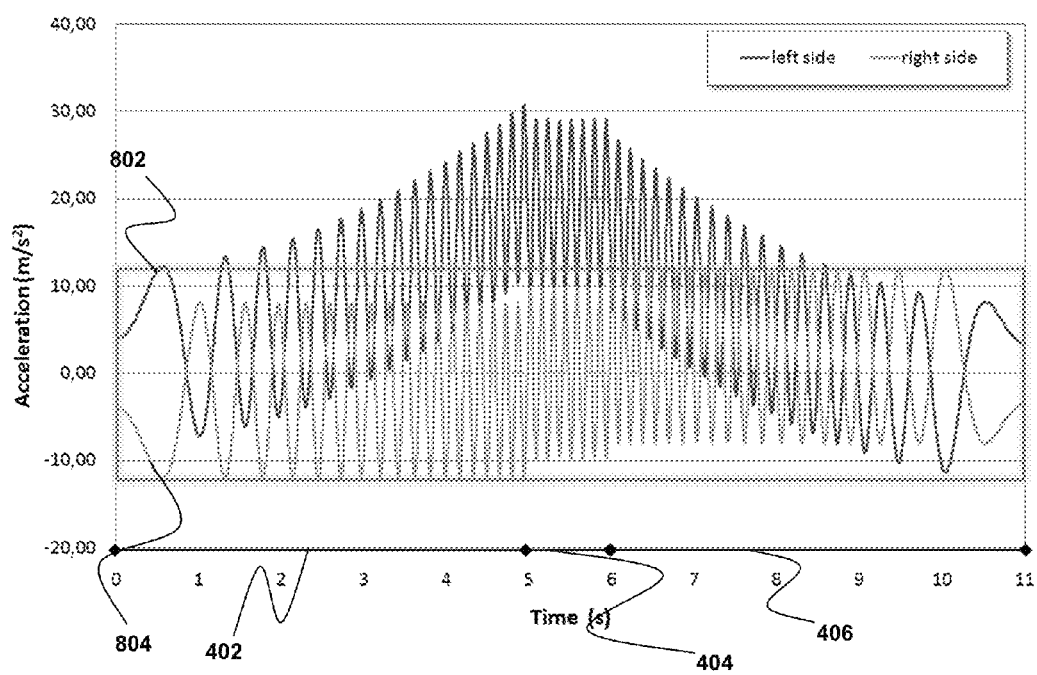
FIG. 8 depicts a graph of acceleration for a non-tangentially-fitted TPMS sensor fitted in a left tire and a tangentially-fitted TPMS sensor fitted in a right tire as a function of time for the example travel situation of FIG. 4 according to an embodiment.

Referring to FIG. 8, a graph of acceleration for a TPMS sensor fitted in a left tire 802 having an error of 10 degrees in the radial direction from a true tangential fit and a tangentially-fitted TPMS sensor fitted in a right tire 804 as a function of time for the example travel situation of FIG. 4 is depicted. When compared with the acceleration graph of FIG. 5, the overlaying radial acceleration provides an additional obstacle to localization; a drifting shift of the balance point of left tire signal 802 is evident. However, because of the oscillation of the left tire signal 802 and right tire signal 804, correcting for the signal drift is possible. For example, as discussed above, any perfectly tangentially-mounted acceleration sensor 104 should have zero radial acceleration. If a drifting shift is realized, a non-tangentially-fitted sensor is present. By calculating the vehicle velocity, a correction of the signal drift (and subsequent shift of the balance point) of left tire signal 802 can be achieved due to the relation of radial acceleration to velocity, whereby radial acceleration is proportional to squared velocity. In another example, a non-zero balance point can also be present in a sensor 104 due to a manufacturing defect or fabrication error, but a zero balance point can still be achieved, at least when the vehicle is idle, if the sensor 104 is non-tangentially mounted in a way that compensates for the offset. In either the case of a perfectly tangentially-mounted acceleration sensor 104 or the case of an imperfectly mounted acceleration sensor 104, the same equation can be used because, in the case of a perfectly mounted acceleration sensor 104, the radial component is zero.

Figure 9:
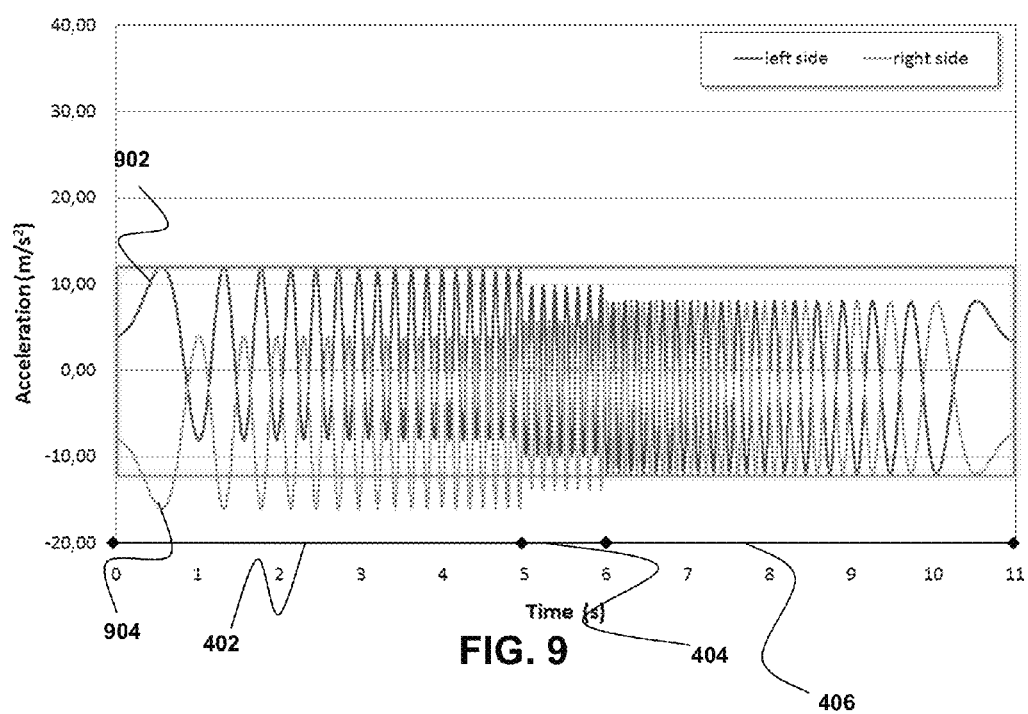
FIG. 9 depicts a graph of acceleration for a tangentially-fitted TPMS sensor fitted in a left tire having a constant offset and a tangentially-fitted TPMS sensor fitted in a right tire having no offset as a function of time for the example travel situation of FIG. 4 according to an embodiment.

A similar problem arises in the case of acceleration sensor 104 fabrication defects whereby acceleration sensor 104 has a constant offset. Referring to FIG. 9, a graph of acceleration for a tangentially-fitted TPMS sensor fitted in a left tire having a constant offset and a tangentially-fitted TPMS sensor fitted in a right tire having no offset as a function of time for the example travel situation of FIG. 4 is depicted. The balance point of right tire signal 904 is below zero due to a constant offset in acceleration sensor 104 for left tire signal 904. Nevertheless, the frequency change of the alternating components left tire signal 902 and right tire signal 904 indicates an acceleration situation during time 0 to time 5 at 402 and a deceleration during time 6 to time 11 at 406. Further, as described above, measuring the vehicle acceleration component as a shift from the previously-measured zero acceleration point, coupled with the knowledge of the relative positioning of acceleration sensor 104 within the tire allows for partial localization.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:
1. A system comprising:
a plurality of wheel modules, each wheel module associated with a wheel of a vehicle and comprising an acceleration sensor configured to sense acceleration related to the wheel, wherein each acceleration sensor has a uniform acceleration sensor placement relative to the wheel, and each acceleration sensor has an acceleration sensor profile defining at least an axis of orientation of the acceleration sensor relative to the wheel such that wheels on opposite sides of the vehicle have opposite axes of orientation; and
a central receiver unit configured to receive signals from the plurality of wheel modules, the signals comprising acceleration data sensed by the acceleration sensor, and to partially localize each wheel of the vehicle by evaluating the received signals relative to the acceleration sensor profile and identifying at least one zero-acceleration point between the received signals, wherein the at least one zero-acceleration point can be used to determine whether an offset error from the uniform acceleration sensor placement relative to the wheel of at least one of the plurality of wheel modules has occurred, wherein the identifying the zero-acceleration point comprises:
determining an offset between the received signals as modulated by gravity; and determining a difference in the offset between the received signals from the at least one zero acceleration point in order to determine a magnitude of acceleration.

2. The system of claim 1, wherein each of the plurality of wheel modules comprises a tire pressure monitoring system (TPMS) wheel module.

3. The system of claim 2, wherein each of the plurality of wheel modules further comprises a pressure sensor.

4. The system of claim 1, wherein the acceleration sensor for a wheel located on a first side of a vehicle is mounted such that a positive axis of the acceleration sensor is exposed when the vehicle moves in a forward direction, and the acceleration sensor for a wheel located on a second side of the vehicle is mounted such that a negative axis of the acceleration sensor is exposed when the vehicle moves in the forward direction.

5. The system of claim 1, wherein each of the plurality of wheel modules comprises a radio frequency (RF) communications unit.

6. A wheel module, the wheel module associated with a wheel of a vehicle, comprising:
an acceleration sensor configured to sense acceleration related to the wheel, the sensed acceleration being oscillated by gravity when the wheel is in motion, and the acceleration sensor having an acceleration sensor profile defining at least an axis of orientation of the acceleration sensor relative to the wheel;
a communications unit configured to receive acceleration data from a second wheel module; a microcontroller configured to accumulate data from the acceleration sensor and partially localize the wheel module relative to the second wheel module based on the acceleration sensor profile and the accumulated sensor data, wherein the microcontroller is further configured to determine a zero-acceleration point between the accumulated acceleration sensor data and the second wheel module acceleration data and determine an offset error between the accumulated acceleration sensor data and the second wheel module acceleration data, wherein the determining the zero-acceleration point comprises:
determining an offset between the accumulated acceleration sensor data and the second wheel module acceleration data as modulated by gravity; and
determining a difference in the offset between the accumulated acceleration sensor data and the second wheel module acceleration data from the determined zero acceleration point in order to determine a magnitude of acceleration; and
a power source configured to provide power to at least the acceleration sensor, microcontroller, and communications unit.

7. The wheel module of claim 6, further comprising a pressure sensor configured to sense pressure of the wheel, wherein the microcontroller is further configured to accumulate data from the pressure sensor and the power source is further configured to provide power to the pressure sensor.

8. The wheel module of claim 6, further comprising a temperature sensor configured to sense the temperature of the wheel, wherein the microcontroller is further configured to accumulate data from the temperature sensor and the power source is further configured to provide power to the temperature sensor.

9. The wheel module of claim 6, wherein the acceleration sensor is a single-axis acceleration sensor.

10. The wheel module of claim 9, wherein the acceleration sensor is in a decentered location relative to the wheel.

11. A wheel module, the wheel module associated with a wheel of a vehicle, comprising:
an acceleration sensor configured to sense acceleration related to the wheel, the sensed acceleration being oscillated by gravity when the wheel is in motion, and the acceleration sensor having a fixed-orientation mounting position relative to the wheel;
a microcontroller configured to accumulate data from the acceleration sensor;
a communications unit configured to transmit data from the microcontroller to a central receiver unit to identify at least one zero-acceleration point between the accumulated sensor data and acceleration data from a second wheel module and partially localize the wheel module relative to the vehicle based on the acceleration mounting position and the data accumulated from the acceleration sensor, wherein the at least one zero-acceleration point is used to determine a presence of an offset error between the accumulated sensor data and acceleration data from the second wheel module, wherein the identifying the at least one zero-acceleration point comprises:
determining an offset between the accumulated sensor data and acceleration data from the second wheel module as modulated by gravity; and
determining a difference between the offset of the accumulated sensor data and acceleration data from the second wheel module from the at least one zero acceleration point in order to determine a magnitude of acceleration; and
a power source configured to provide power to at least the acceleration sensor, microcontroller, and communications unit.

12. The wheel module of claim 11, wherein the communications unit is further configured to transmit data from the microcontroller to the central receiver unit to calculate a magnitude of acceleration based on the acceleration mounting position.

13. The wheel module of claim 12, wherein the zero-acceleration point is calculated by a difference between the accumulated sensor data and the acceleration data from the second wheel module when no oscillation is present.

14. The wheel module of claim 13, wherein the offset is calculated by a difference between the accumulated sensor data and the acceleration data from the second wheel module when oscillation is present.

* * * * *